US010244008B1

(12) United States Patent
Rathnam et al.

(10) Patent No.: US 10,244,008 B1
(45) Date of Patent: Mar. 26, 2019

(54) VOICE CHANNEL MANAGEMENT IN A COMMUNICATION SYSTEM

(71) Applicant: Republic Wireless, Inc., Raleigh, NC (US)

(72) Inventors: Sai Rathnam, Raleigh, NC (US); Justin Milam, Burgaw, NC (US); Ryan McShane, Raleigh, NC (US); Adam Cook, Apex, NC (US); Brandon Smith, Cary, NC (US); Carl Nelson, Apex, NC (US); Sam Quaile, Durham, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

(21) Appl. No.: 16/193,474

(22) Filed: Nov. 16, 2018

Related U.S. Application Data

(63) Continuation-in-part of application No. 16/161,719, filed on Oct. 16, 2018.

(51) Int. Cl.
| | |
|---|---|
| *H04W 76/11* | (2018.01) |
| *H04L 29/06* | (2006.01) |
| *H04W 76/45* | (2018.01) |
| *H04W 76/25* | (2018.01) |
| *H04W 4/10* | (2009.01) |
| *H04W 88/06* | (2009.01) |

(52) U.S. Cl.
CPC ...... *H04L 65/1059* (2013.01); *H04L 65/1069* (2013.01); *H04L 65/4061* (2013.01); *H04W 76/11* (2018.02); *H04W 76/25* (2018.02); *H04W 76/45* (2018.02); *H04W 4/10* (2013.01); *H04W 88/06* (2013.01)

(58) Field of Classification Search
CPC ...... H04W 76/25; H04W 88/04; H04W 88/06
See application file for complete search history.

(56) References Cited

U.S. PATENT DOCUMENTS

2015/0098417 A1* 4/2015 Hughes ................... H04W 4/60
370/329

* cited by examiner

*Primary Examiner* — Keith Ferguson
(74) *Attorney, Agent, or Firm* — Gregory Stephens

(57) ABSTRACT

Techniques are disclosed for managing communication channels in a communication system that includes communication devices and a communication server. In one embodiment, a communication device may receive an invitation to join a new communication channel, the invitation comprising a universal resource locator (URL) link to a location that contains instructions for joining the new communication channel. The communication device may then launch a companion application in response to activating the URL link where the companion application may be associated with an account administered by a communications server. The companion application may be configured to manage one or more communication devices. A user may select from among the communication devices managed by the companion application to be added to the new communication channel and send, to the communication server, an acceptance to the invitation to join the new communication channel. The acceptance may include an identity of the selected communication devices to add to the new communication channel.

18 Claims, 7 Drawing Sheets

100

200

300

400

500

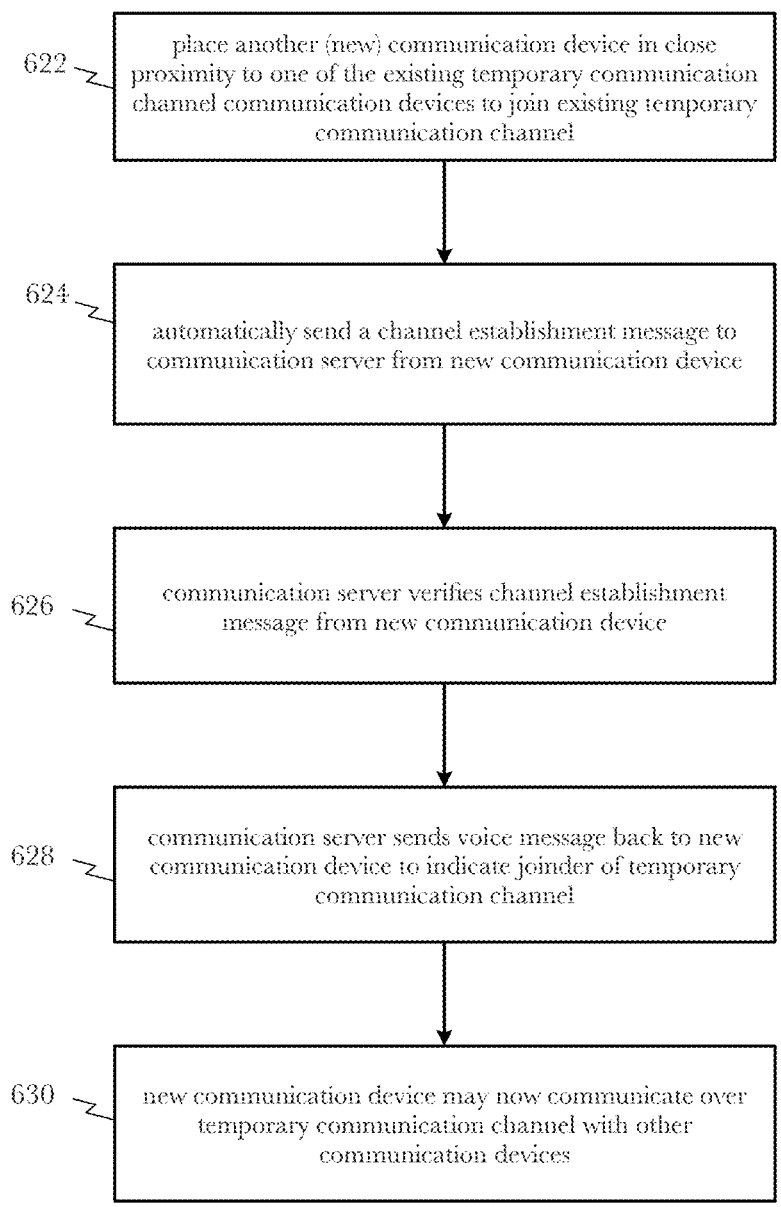

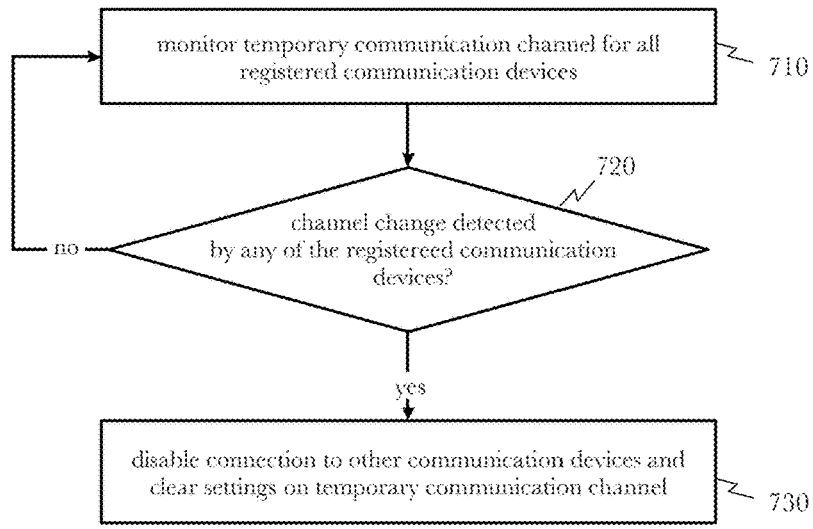
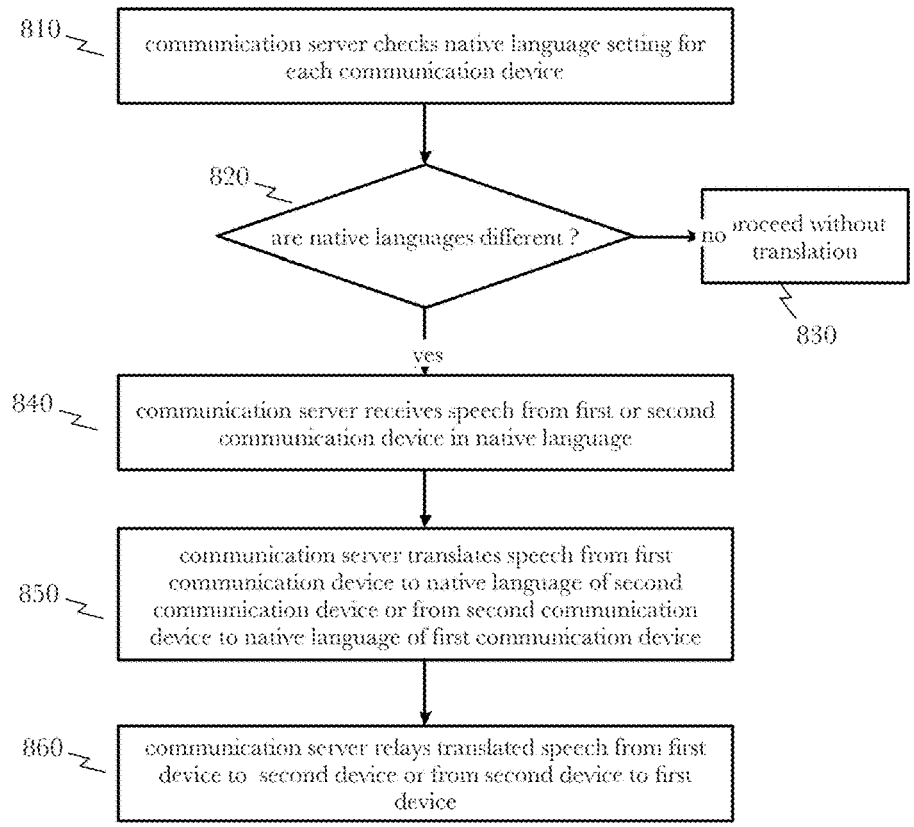

900

VOICE CHANNEL MANAGEMENT IN A COMMUNICATION SYSTEM

TECHNICAL FIELD

Examples described herein are generally related to techniques for providing a voice channel management in a communication system.

BACKGROUND

A new form of communication device utilizing asynchronous style communication over known wireless communication protocols such as 802.11 WiFi and cellular are starting to come to market. For instance, the Relay device by Republic Wireless® is a screenless disk-like handheld device that can enable voice communication with other Relay devices similar to the way walkie-talkies communicate. To provide a more robust communication experience, these devices need to be able to set up and manage communication channels with one another quickly and easily. Devices without screens for visual output or a plethora of buttons make channel management more difficult.

Many of these communication devices utilize an Internet Protocol (IP) communication link rather than a circuit switched communication link to exchange voice data with a communications server. The communications server mediates voice messages between and among various endpoints. The communication device(s) may wirelessly connect to an IP network over one or more wireless IP interfaces and communication links.

The IP communication link may be 802.11 based such as WiFi or may be cellular based utilizing at least one of the many cellular IP air interfaces. There are several cellular IP air interfaces already in existence that use specific frequency ranges that are suitable for use with the embodiments described herein. It should be noted that the term 802.11 encompasses all of the 802.11 versions that currently exist and may be developed. Some cellular IP air interface examples include the General Packet Radio Service (GPRS), Enhanced Data for GSM Evolution (EDGE), Evolution-Data Optimized (EV-DO), High Speed Packet Access (HSPA), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), and High Rate Packet Data (HRPD). Moreover, there are many more wireless IP air interfaces in the planning and/or experimental stages (e.g., 5G, light-wave based, etc.) that use the same and/or different frequencies that would also be suitable for use with the embodiments described herein.

What is needed are techniques for easily and intuitively managing communication channels for such devices.

BRIEF DESCRIPTION OF THE DRAWINGS

FIG. 6B illustrates another example of a logic flow diagram according to an embodiment of the invention.

FIG. 7 illustrates yet another example of a logic flow diagram according to an embodiment of the invention.

FIG. 8 illustrates still another example of a logic flow diagram according to an embodiment of the invention.

DETAILED DESCRIPTION

Figure 1:
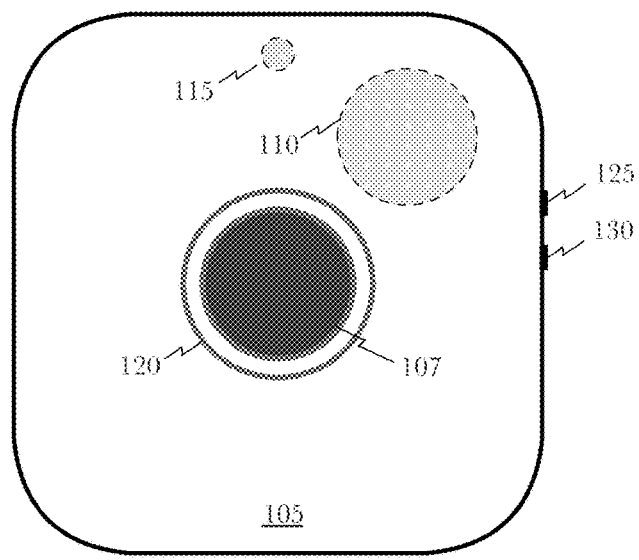
FIG. 1 illustrates a block diagram of a portable communication device according to an embodiment of the invention.

The embodiments described herein disclose systems, methods, and computer program products for establishing and managing voice communications between or among devices on an asynchronous network. The embodiments may also describe systems, methods, and computer program products for interpreting voice communications between or among devices in which the users may speak different languages on an asynchronous network. The systems and methods of the invention may be embodied in and performed by network based communications server(s) and other related components (e.g., databases), and software instructions executed by some or all of such devices and components, as will be explained in detail below. The different types of networks contemplated herein include, for example, IP based cellular mobile networks, and IP data networks, such as the Internet or other IP-based networks, including wide area networks, local area networks, and combinations thereof that include wireless 802.11 and wireless IP cellular means of access.

As used herein the term "communication device" is meant to generally indicate an end user physical device intended for, among other things, exchanging voice communication with other similar communication devices over one or more inter-connected communication networks. A communication device may be equipped with multiple RF transceivers including an 802.11 WiFi transceiver, a cellular banded transceiver, and (optionally) a Bluetooth transceiver. Other similar RF transceivers configured to use various frequency ranges may also be implemented on the communication device as they are developed. Other examples may be understood to those of ordinary skill in the art.

As used herein the term "voice communication" is meant to generally indicate any intended an asynchronous exchange of voice data among two or more communication devices. Asynchronous, in this specification, refers to a mode of communication wherein a single device controls the transmit mode at any given moment while the other devices are restricted to receive mode. Once the device in transmit mode relinquishes the channel, any other communication device may assume transmit capability.

As used herein the term "channel" is meant to generally indicate a logical connection among two or more communication devices. Communication devices must be registered with the same channel to communicate with one another.

As used herein, the term "communications server" is intended to mean an IP based computer that, among other capabilities, mediates and manages voice communications and translations among communication devices over one or more inter-connected communication networks.

As used herein, the term "communication link" is intended to mean a physical and/or logical path that connects a communication device with the IP based communications server. A communication link may be a signaling link, a media link, or both. In this context, a voice communication may be established via one or more communication links in which the IP based communications server is an endpoint for each of the communication links. The IP based communications server may then join one or more communication links together to establish a channel between or among two or more communication devices. The IP based communications server may be hosted within an IP network accessible to the Internet.

References herein to a communication device capable of connecting to or communicating via a mobile radio access network (MRAN) refer to a communication device equipped with a cellular transceiver for wireless communication with basestations for purposes of accessing cellular IP data services. Similarly, references herein to a communication device capable of connecting to or communicating via an IP data network refer to a communication device equipped with a transceiver for wireless communication (e.g., 802.11 WiFi) with a router or other IP data network access point.

FIG. 1 illustrates a block diagram 100 of a portable communication device 105 according to an embodiment of the invention. From an external user point of view, the communication device 105 may include an input button 107 generally used to put the communication device 105 into a transmission mode. Transmission mode may indicate the user is speaking a voice communication that is intended to be relayed to the other communication devices subscribed to the active channel. A microphone 115 picks up the speech to be transmitted while a speaker 110 outputs or plays back received audio such as voice communications that are received. A light emitting diode (LED) 120 mechanism in the shape of a ring surrounding the input button 107 may be implemented as a mechanism of providing certain types of visual feedback. A pair of buttons 125, 130 may also be included. For instance, button 125 may serve as both a power button and a channel switching button depending on the way the user actuates the button. A long press may toggle the communication device between power-on and power-off while short presses may toggle the communication device through a series of channels. The aforementioned description of the communication device is illustrative only. On of ordinary skill in the art may vary the design of the communication device without altering or affecting the claimed patentable elements, steps, or processes made herein.

Figure 2:
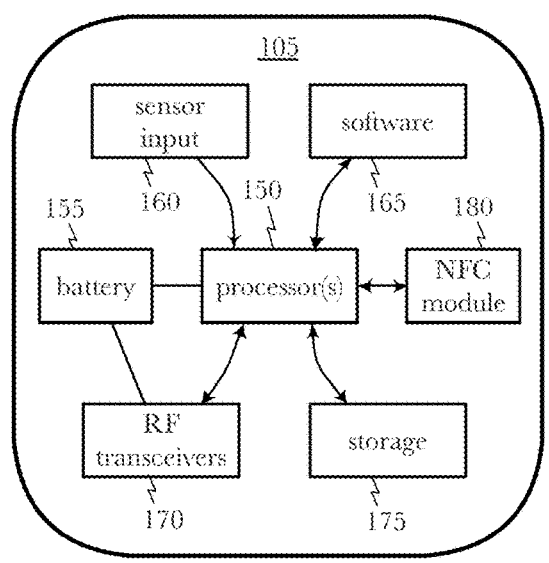
FIG. 2 illustrates a portable communication device according to an embodiment of the invention.

FIG. 2 illustrates a portable communication device 105 according to an embodiment of the invention. From an internal component point of view, the communication device 105 may include one or more processors 150 for executing instructions, processing data, and controlling the functions of the communication device 105. A sensor input component 160 may receive and send signals and/or data between the processor(s) 150 and the various user input/output components such as the microphone 115, speaker 110, LED 120, and buttons 125, 130. A generalized software component 165 includes computer code for controlling and executing the various functions of the communications device 105. The software component 165 may also represent downloaded or pre-loaded software applications. The software component may be stored in storage component 175 which may be one or both of random access memory (RAM) or Read-only memory (ROM). The storage component 175 may also encompass mechanisms like subscriber identity module (SIM) cards. The communication device 105 is powered by a power source such as, for instance, a battery 155 coupled with the components needing power like the processor(s) 150 and RF transceivers 170, and NFC module 180. The RF transceivers 170 may be embedded into chip sets for cellular communication, 802.11 WiFi communication, and Bluetooth communication. The NFC module 180 provides a data exchange capability between two communication devices 105 for various purposes including the ability to exchange general identification information and native language data.

Figure 3:
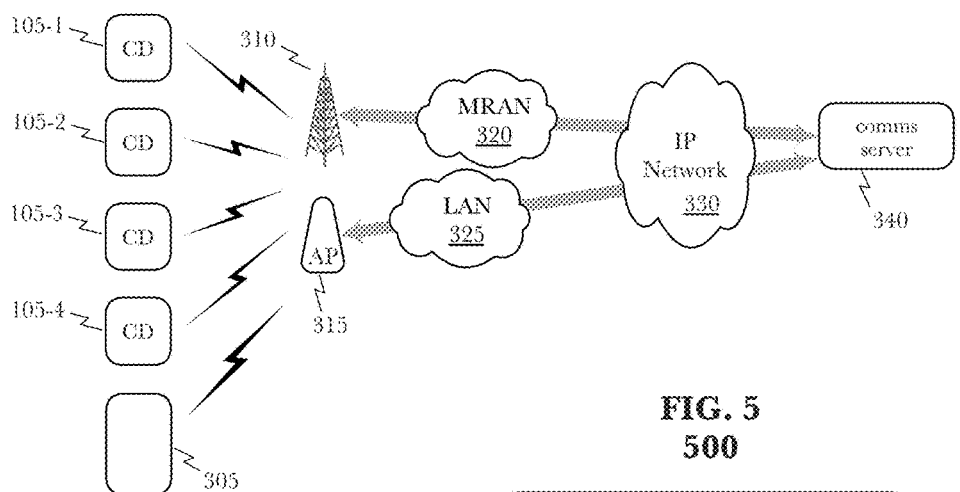
FIG. 3 illustrates an example block diagram for a networked environment.

FIG. 3 illustrates an exemplary networked environment 300 for implementing certain exemplary embodiments described herein. The networked environment 300 may include multiple distinct inter-connected networks such as, for instance, a large scale internet protocol (IP) network (e.g., the Internet) 330, one or more IP based local area networks or wide area networks (LANs/WANs) 325 including 802.11 wireless access point(s) 315, and one or more mobile radio access networks (MRANs) 320 accessible via a cellular basestation tower(s) 310.

It should be noted that alternative wireless IP based networks (not shown) that do not operate over the frequency spectrum typically associated with 802.11 (e.g., WiFi) or cellular may be implemented. One example of such an alternate wireless IP network may be WiMAX (e.g., 802.16). Other examples may include, but are not limited to, networks utilizing television whitespace frequencies and other unlicensed (or yet to be licensed) frequencies, including, but not limited to, those under consideration for 5G implementations. These may include wireless networks operating within a frequency range of 100 MHz and 700 MHz, 1000 MHz industrial, scientific, and medical (ISM) bands, and wireless networks operating within a frequency range of 3.5 GHz and 3.7 GHz, and anything at or above 5 GHz including light-wave based transmission systems.

The MRANs 320 and the LANs 325 each have backhaul IP connectivity to the Internet 330 that provide connectivity with a communications server 340. In certain embodiments, MRANs 320 include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed/developing cellular network IP standards—e.g., 5G.

In addition to circuit switched radio transmission schemes, each MRAN 320 may also provide communication devices 105-1, 105-2, 105-3, 105-4 as well as a smartphone 305 (or other screen enabled device) executing a specialized communications application with wireless IP based data access to the Internet 330 using one of the aforementioned cellular IP protocols. For illustration only, four (4) communication devices 105-1, 105-2, 105-3, 105-4 have been illustrated. The architecture of FIG. 3 and the broader description herein may support any number of communication devices. Similarly, an IP access point 315 may provide wireless connectivity for communication devices 105-1, 105-2, 105-3, 105-4 as well as smartphone 305 (or other screen enabled device) to the Internet 330 using any of the 802.11 WiFi standards and/or any other type of IP based connectivity standard.

In operation, communication device(s) 105-1, 105-2, 105-3, 105-4 as well as smartphone 305 (or other screen enabled device) may establish a connection with and register with the communications server 340. The connection may comprise one or more communication links utilizing LAN 325 or MRAN 320. Once established, the communication device(s) 105-1, 105-2, 105-3, 105-4 as well as smartphone 305 (or other screen enabled device) may exchange data, including voice communications, with the communication server 340. Communication server 340 manages a plurality of communication device(s) 105-1, 105-2, 105-3, 105-4 as well as one or more smartphones 305 (or other screen enabled devices) and includes, among other things, the capability to establish and manage private communication channels between and among multiple communication devices 105-1, 105-2, 105-3, 105-4 as well as smartphones 305 (or other screen enabled devices).

Smartphone 305 may include a software module or executable application capable of channel establishment and management. The channel establishment and management application may be responsible for setting up, managing, and tearing down communication channels among communication devices 105-1, 105-2, 105-3, 105-4 or other smartphones 305. Once a channel is established among two or more communication devices 105-1, 105-2, 105-3, 105-4 or smartphones 305, those communication devices 105-1, 105-2, 105-3, 105-4 and smartphones may send and receive voice communications to one another over the established channel.

In one embodiment, two or more communication devices (e.g., 105-1, 105-2) may like to establish a communication channel with one another. One such method of establishing a communication channel may utilize the NFC module 180 of each communication device 105-1, 105-2.

In another embodiment, one or more smartphones 305 (or other screen enabled devices) executing a specialized communications application may establish a communication channel on behalf of one or more communication devices 105-1, 105-2, 105-3, 105-4 as well as smartphones 305 (or other screen enabled devices).

Figure 4:
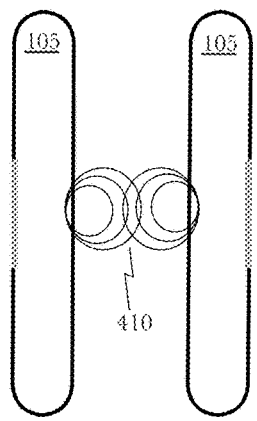
FIG. 4 illustrates a pair of portable communication devices in a close proximity data exchange orientation according to an embodiment of the invention.

FIG. 4 illustrates a pair of portable communication devices 105-1, 105-2 in a close proximity near field communication (NFC) data exchange orientation 410 according to an embodiment of the invention. NFC is a set of standards for portable devices. It allows them to establish peer-to-peer radio communications, passing data from one device to another by putting them very close to one another. NFC is a means of sending and receiving data over radio waves. In that sense it is similar to Wi-Fi or Bluetooth, but unlike those protocols, NFC can be used to induce electric currents within passive components as well as just send data. NFC's data-transmission frequency is around 13.56 MHz and can typically transmit data at 106, 212 or 424 Kbps (kilobits per second). NFC devices can be full-duplex meaning they are able to receive and transmit data at the same time.

In one embodiment, when two communication devices 105-1, 105-2 are brought within close enough proximity with one another, an NFC exchange 410 occurs in which each communication device 105-1, 105-2 reads or receives an identity token of the other communication device 105-1, 105-2. Each communication device 105-1, 105-2 may then upload this data to the communication server 340. The communication server 340 may then associate the two communication devices 105-1, 105-2 with one another and establish a private communication channel between them.

Figure 5:
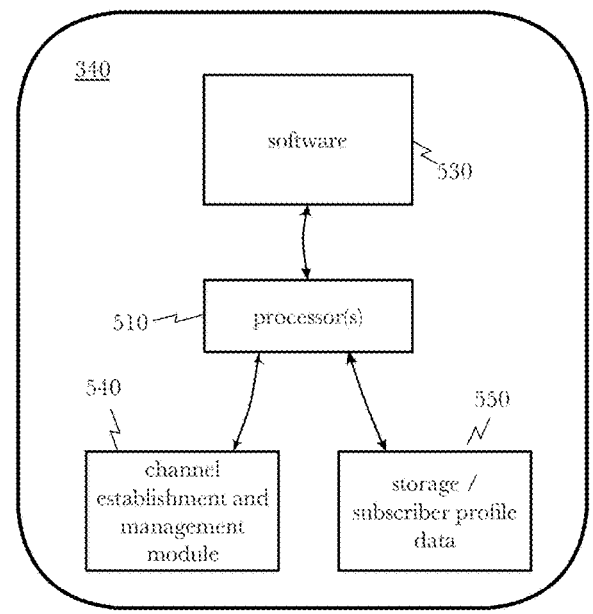
FIG. 5 illustrates a block diagram of a communications server according to an embodiment of the invention.

FIG. 5 illustrates a block diagram 500 of a communications server 340 according to an embodiment of the invention. The communications server 340 may include one or more processor(s) 510 coupled with a data storage/subscriber profile data component 550 comprised of subscriber profile data. The subscriber profile data may include device identification information linking particular communication devices 105-1, 105-2, 105-3, 105-4 to particular subscribers and/or accounts of subscribers. The subscriber profile data may further include a field or record identifying the native or preferred language associated with the communication device 105-1, 105-2, 105-3, 105-4. In addition, one account may have multiple communication devices 105-1, 105-2, 105-3, 105-4 associated therewith. The storage component 550 may also store software applications 530.

One such software module may be characterized as a channel establishment and management module 540. The channel establishment and management module may be responsible for setting up, managing, and tearing down communication channels among communication devices 105-1, 105-2, 105-3, 105-4. Once a channel is established among two or more communication devices 105-1, 105-2, 105-3, 105-4, those communication devices 105-1, 105-2, 105-3, 105-4 may send and receive voice communications to one another over the established channel.

The communication server 340 may receive voice communications from a particular communication device (e.g., 105-1) in a first language and translate the voice communication into a second language. Once translated, the communication server 340 may forward the translated voice communication to the other communication device(s) 105-2, 105-3, 105-4 in the channel. Speech translation may be invoked during channel establishment due to the discovery by the communication server 340 that the communication devices 105-1, 105-2, 105-3, 105-4 do not share the same native language. For instance, during channel establishment, one of the items of data sent to the communication server may be an indication of the native language associated with the particular communication device 105-1, 105-2, 105-3, 105-4 which may be pre-set when first activating the communication device 105-1, 105-2, 105-3, 105-4 on the network. The language identifier may also be changed by editing the subscriber's profile data stored in the communication server 340. For instance, the language identifier may be changed by a companion application linked with the communication device 105-1, 105-2, 105-3, 105-4 or through a recognizable voice command given to the communication device 105-1, 105-2, 105-3, 105-4 by the subscriber. The native language associated with a communication device 105-1, 105-2, 105-3, 105-4 informs the communication server 340 the language the communication device 105-1, 105-2, 105-3, 105-4 should output any voice communication with other communication devices 105-1, 105-2, 105-3, 105-4 or audio sources.

FIGS. 6-8 illustrate examples of logic flow diagrams according to embodiments of the invention. The logic flows may be representative of some or all of the operations executed by one or more embodiments described herein. Further, the logic flows may performed by circuitry and one or more components discussed herein. Moreover, logic flows may be performed in conjunction with one or more other logic flows discussed herein and lists particular steps occurring in a particular order. However, embodiments are not limited in this manner and any step may occur in any order. Further, steps of the logic flows may not be dependent upon one another and as such particular steps in the logic flows may not occur.

Figure 6A:
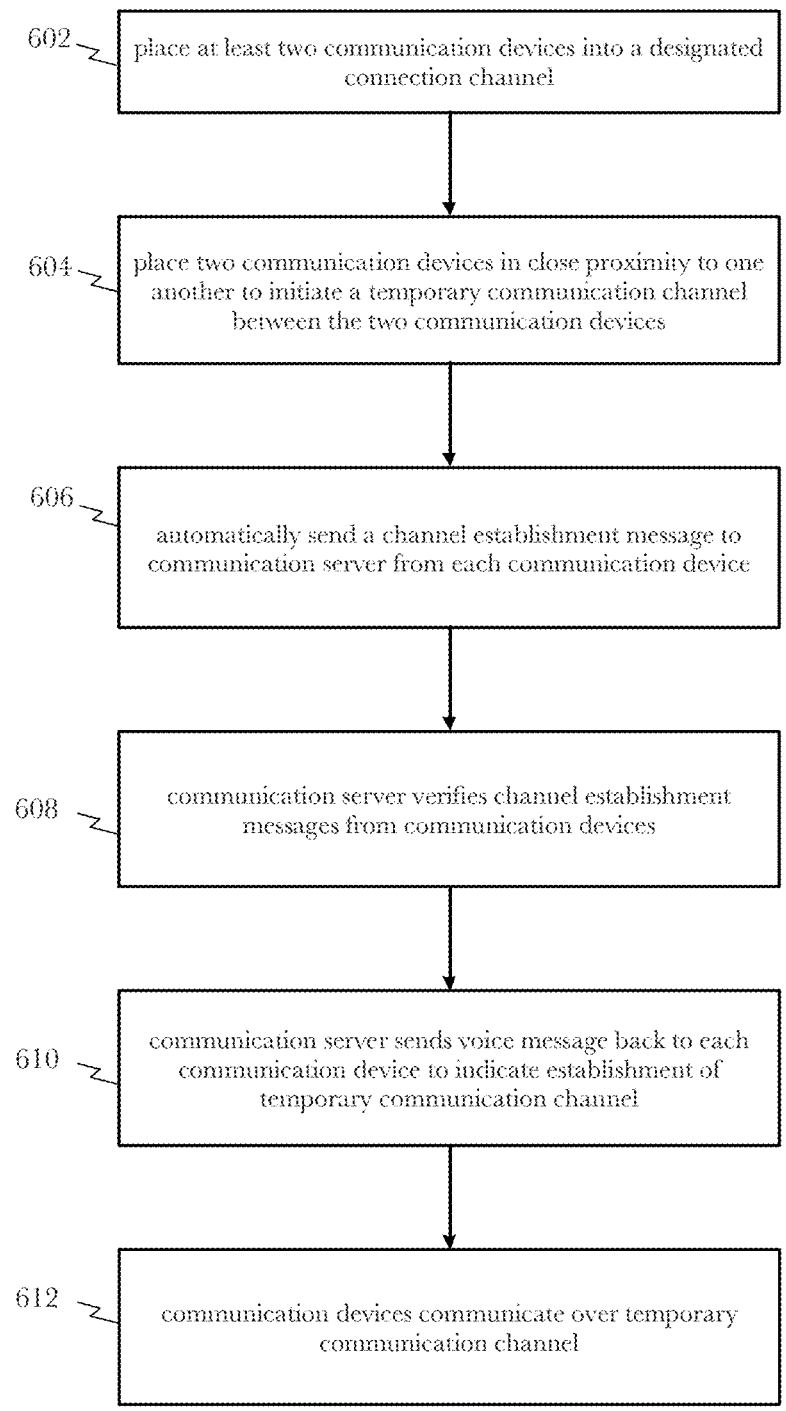
FIG. 6A illustrates an example of a logic flow diagram according to an embodiment of the invention.

FIG. 6A illustrates an example logic flow diagram 600 according to an embodiment of the invention. Logic flow diagram 600 may facilitate the creation of a communication channel among two or more communication devices 105-1, 105-2, 105-3, 105-4 on a temporary and ad-hoc basis using an NFC assisted technique. In step 602, at least two communication devices 105-1, 105-2 may be placed into a pre-defined or reserved connection channel. The NFC equipped communication devices 105-1, 105-2 may then be placed in sufficient proximity to one another such as back to back in step 604 to initiate a process for creating a temporary communication channel between the two communication devices 105-1, 105-2. In some instances, the communication devices 105-1, 105-2 may be bumped together to ensure the NFC proximity requirement is satisfied. In one embodiment, the NFC coupling may generate the same random token for each communication device 105-1, 105-2. Once an NFC coupling is made between the communication devices 105-1, 105-2, each communication device 105-1, 105-2 may automatically send a channel establishment message to the communication server 340 at step 606. In an embodiment, the channel establishment message may include the randomly generated token. Once the communication server 340 receives the channel establishment message from each communication device 105-1, 105-2, it may verify them prior to setting up the temporary communication channel at step 608. In an embodiment, the communication server 340 may compare the random tokens from each received channel establishment message. If the random tokens are identical, the channel establishment messages are validated and the communication server 340 creates the temporary channel between the two communication devices 105-1, 105-2. If the random tokens do not match, the temporary communication channel may not be established. If the communication server 340 does create the temporary channel between the two communication devices 105-1, 105-2, it will send an acknowledgment voice message back to each communication device 105-1, 105-2 to indicate establishment of the channel and that it is ready to use at step 610. The communication devices 105-1, 105-2 may then communicate with one another over the temporary communication channel in step 612.

FIG. 6B illustrates an example logic flow diagram according to an embodiment of the invention. Sometimes, an additional communication device 105-3 may wish to join the just established temporary private communication channel. In such cases, the additional (i.e., new) communication device 105-3 need only may be placed in sufficient NFC proximity to another communication device 105-1, 105-2 already in the private communication channel to join in step 622. The new communication device 105-3 may then automatically send a channel establishment message to the communication server 340 at step 624. In an embodiment, the channel establishment message also includes the token generated originally or an entirely new token may be generated. Once the communication server 340 receives the channel establishment message from the new communication device 105-3, it may verify it prior to joining it to the temporary communication channel at step 626. In an embodiment, the communication server 340 may compare the token from in the channel establishment message received from the new communication device 105-3 to see if it matches the token provided in the original channel establishment messages. Alternatively, new random tokens may have been generated and sent by the new communication device 105-3 and the communication device 105-1, 105-2 already in the temporary communication channel. In either case, if the random tokens are identical, the channel establishment messages are validated and the communication server 340 joins the new communication device 105-3 to the temporary channel. If the random tokens do not match, the new communication device 105-3 is not permitted to join the temporary communication channel. If the communication server 340 does permit the new communication device 105-3 to join the temporary channel, it will send an acknowledgment voice message back to the new communication device 105-3 to indicate establishment of the channel and that it is ready to use at step 628. All the communication devices 105-1, 105-2, 105-3 may then communicate with one another over the temporary communication channel in step 630.

FIG. 7 illustrates an example logic flow diagram 700 according to an embodiment of the invention. Because the temporary communication channel established among two or more communication devices 105-1, 105-2, 105-3, 105-4 as described above is temporary, there may be a mechanism or condition that disables the temporary communication channel for a communication device 105-1, 105-2, 105-3, 105-4. In one embodiment, the communication server 340 may monitor the temporary communication channel on all the communication devices 105-1, 105-2, 105-3 in the channel at step 710. For instance, the communication server 340 may determine that each communication device 105-1, 105-2, 105-3 remains 'tuned to' or 'camped on' the recently created temporary communication channel. The communication server 340 may detect when any of the communication devices 105-1, 105-2, 105-3 tune out of the temporary communication channel at step 720. Upon detecting a channel change in step 720 for a particular communication device (e.g., 105-1), the communication server 340 may disable the connection to the other communication devices 105-2, 105-3 and clear any settings associated with the temporary communication channel for communication device 105-1 at step 730.

FIG. 8 illustrates an example logic flow diagram 800 according to an embodiment of the invention. In another embodiment, the communication server may act as an interpreter between two communication devices 105-1, 105-2 translating speech in a first language to speech in a second language. When two communication devices 105-1, 105-2 are subscribed to or 'in' the same communication channel, the communication server 340 may first determine the native language of each communication device 105-1, 105-2 at step 810. For instance, each communication device 105-1, 105-2 may include a native language token or identifier that is known to the communication server 340. This identifier may be changed by the subscriber by, for instance, editing a web-based profile for the communication device 105-1, 105-2 or by giving the communication device 105-1, 105-2 a recognized verbal instruction to change the language identifier. In another embodiment, the communication server 340 may automatically detect the language being spoken by a communication device and consider it to be the native language. There are existing products and code bases that enable language recognition which may be incorporated into the communication server 340.

When two communication devices 105-1, 105-2 are in communication with one another, the communication server 340 may determine if the native languages for each communication device 105-1, 105-2 are different at decision block 820. If not, the communication server 340 may broker the communication between the communication devices 105-1, 105-2 over the communication channel without needing to translate anything at step 830. However, if the communication server 340 determines the native languages for each communication device 105-1, 105-2 are different at decision block 820, the communication server 340 may then translate audio between the two communication devices 105-1, 105-2. In one embodiment, the communication server 340 may receive speech from the first and second communication devices 105-1, 105-2 in one language at step 840. The communication server 340 may then translate the speech received to the native language of the communication device 105-1, 105-2 for which the speech was intended at step 850. The communication server 340 may then relay the translated speech to the other communication device 105-1, 105-2 at step 860. In this manner, the communication server 340 acts as a Rosetta Stone of sorts translating the speech intended for a communication device 105-1, 105-2 into the native language of that communication device 105-1, 105-2.

Additional communication devices 105-3, 105-4 with different native languages may also be joined to the channel. The communications server 340 may then translate to all languages as needed. For instance, suppose communication device 105-1 'speaks' English while communication device 105-2 speaks Spanish, communication device 105-3 speaks French, and communication device 105-4 speaks German. A conversation may ensue where the communication device 105-1 transmitting sends its speech to the communication server 340 where it may be translated into the other three languages and relayed to those communication devices 105-2, 105-3, 105-4 in the appropriate language.

Figure 9:
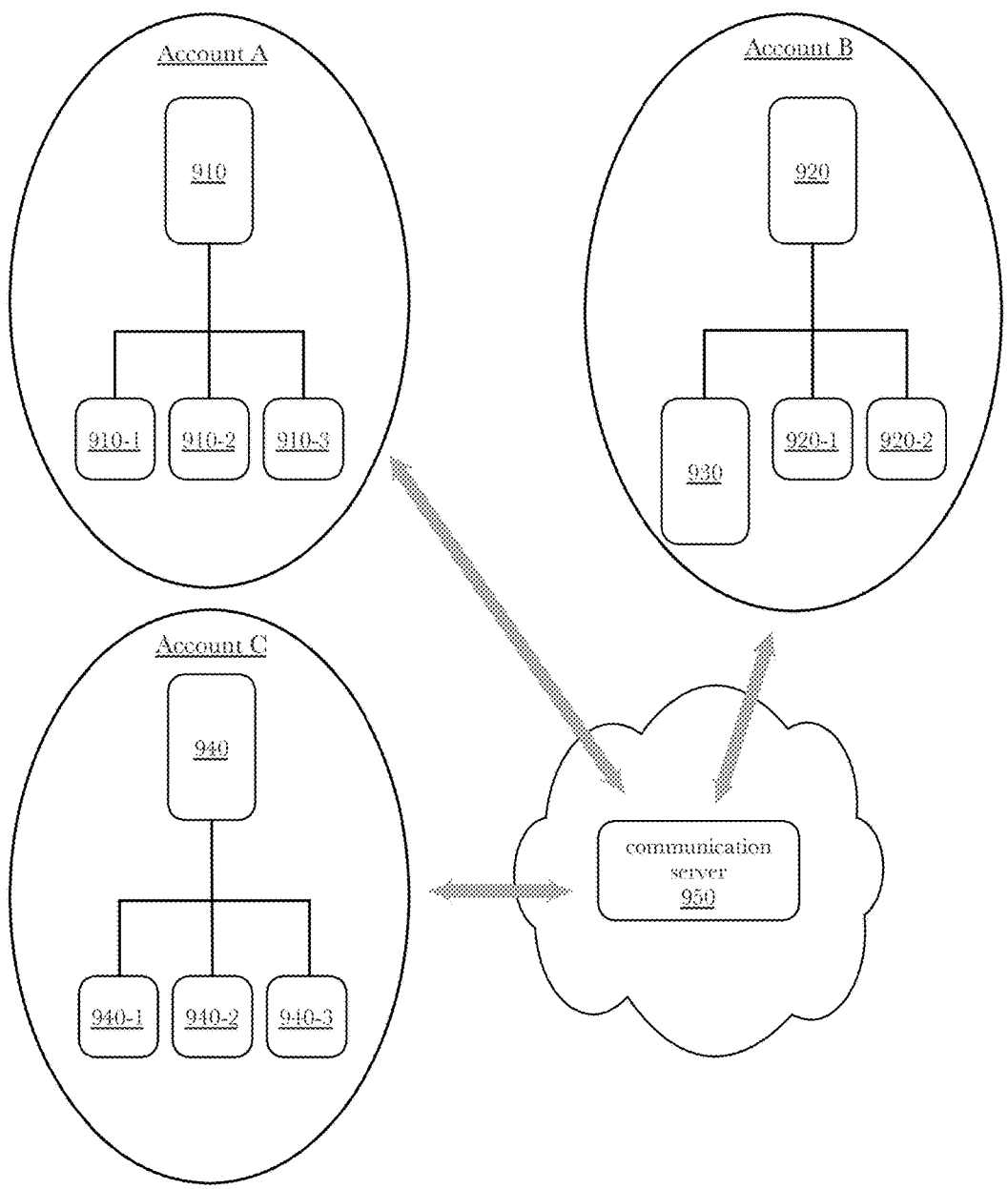
FIG. 9 illustrates an exemplary account structure for implementing certain exemplary embodiments described herein.

FIG. 9 illustrates an exemplary account structure 900 for implementing certain exemplary embodiments described herein. The communication devices may be organized by accounts. For instance, each account may own, control, or manage one or more communication devices. Account information may be stored in a communication server 950 and accessible via a screen enabled computing device such as a smartphone executing a companion application designed specifically to exchange data and messages with communication server 950. In FIG. 9, three (3) accounts are illustrated: account A, account B, and account C. Each account may manage multiple communication devices. For instance, account A may be comprised of a smartphone 910 executing the companion application described above. Account A may also include, for instance, three (3) special purpose screenless communication devices 910-1, 910-2, 910-3 each capable of communicating with the others via communication server 950. In addition, once a new channel establishment process is completed according to the logic flow of FIG. 10, for example, communication devices from different accounts may be configured to communicate with one another.

In one embodiment, smartphone 910 via companion application may initiate a new channel request with communication server 950. Communication server 950 may construct and return a URL link that smartphone 910 may share with other devices 920, 940 running similar companion applications. The companion applications of these other devices 920, 940 may manage one or more other communication devices on behalf of an account holder. Upon receipt of a new channel invitation URL link, devices 920, 940 may open, click on, or otherwise navigate to the location associated with the URL yielding a process for accepting the new channel invitation. The companion application(s) may also designate which specific communication devices under its management are authorized to join the new channel. For example, device 940 may receive the invitation URL and open it. From there, device 940 can designate communication devices 940-1 and 940-3 (but not 940-2) as the devices to be added to the new channel. In another embodiment, device 940 may even add itself to the new channel as the companion application may be capable of performing the communication functions of the communication devices 940-1, 940-2, 940-3.

Figure 10:
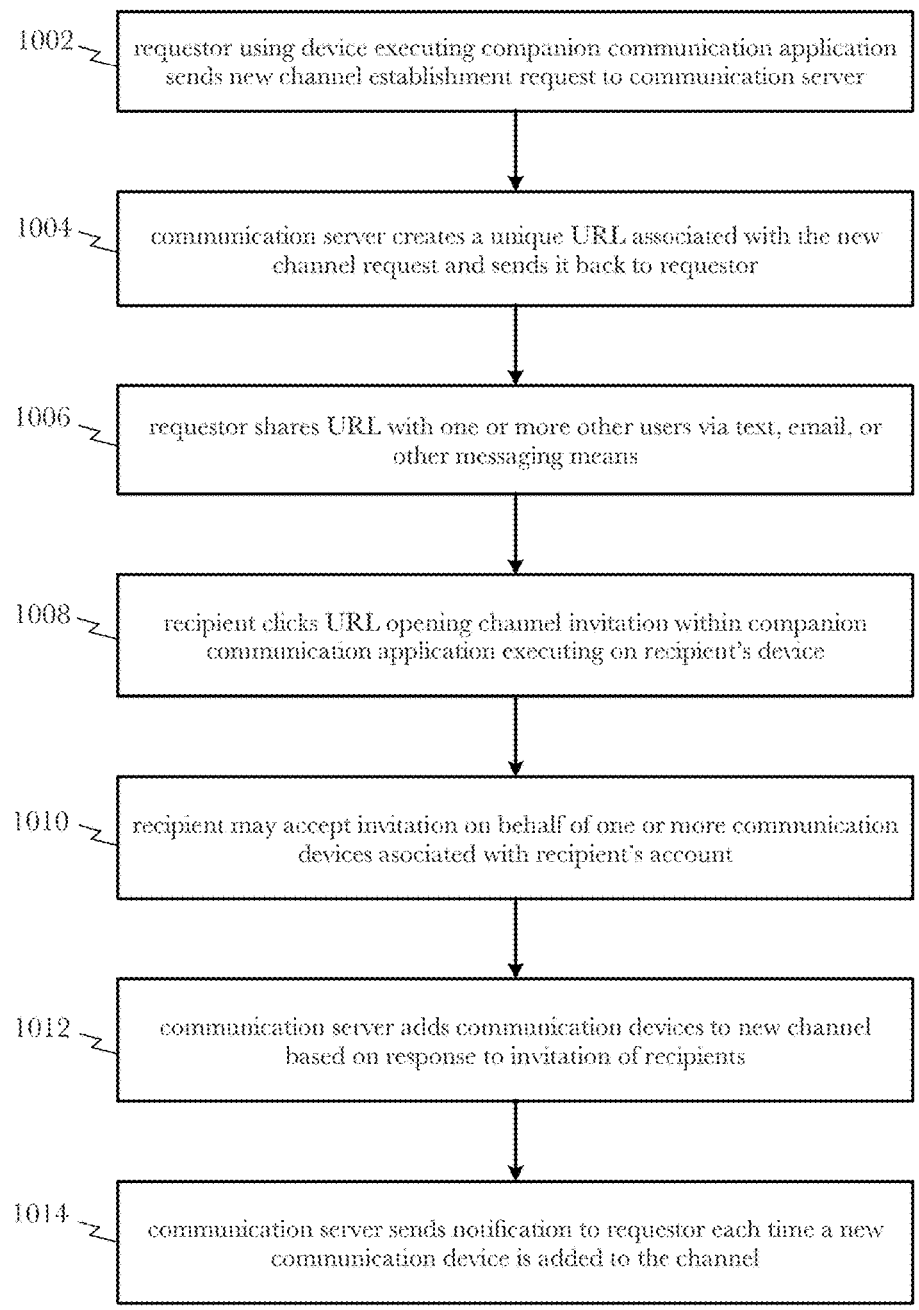
FIG. 10 illustrates still another example of a logic flow diagram according to an embodiment of the invention.

One of ordinary skill in the art may easily discern that any combination of communication devices may be organized into a private communication channel using the techniques described herein, specifically in FIG. 10.

FIG. 10 illustrates an example logic flow diagram 1000 according to an embodiment of the invention. Logic flow diagram 1000 may facilitate the creation of a communication channel among two or more communication devices across different accounts (See, FIG. 9). New channel creation may be achieved using a smartphone (or other screen enabled internet accessible device) executing a companion application acting on behalf of one or more communication devices as well as smartphones (or other screen enabled devices). The companion application may be a software module executable on a screen enabled internet accessible computer device such as a smartphone, tablet, or computer. The companion application may manage a user's account keeping track of the one or more unique communication devices linked to the account.

In block 1002, a requestor through the companion application executing on a smartphone or other screen enabled Internet accessible device 910, 920, 940 may initiate and send a new channel request to a communication server 950. For example, the user may select a "create new channel" option from within the companion application that prompts the user for a name for the new channel and the type of requested channel. Types of channels may include voice chat, game, or others. The communication server 950 may receive the "create new channel" request and create a universal resource locator (URL) link that points to a location that provides the new channel information and an option to join the channel. As an option, the URL link may be made to expire within a certain time period. When this option is invoked, the link and subsequent channel will only be valid and operable until the expiration date. For instance, there may be a group outing over the course of a weekend where the participants may wish to set up a private communication channel for the duration of the outing only. The invitation URL may be set to expire in 48 hours from creation to ensure that the channel is only temporary. This option may keep individual users from having to manage channels that have outlived their usefulness. On the other hand, some new channels may be intended to be more permanent without an expiration date. To set up a permanent channel, the requestor merely not set an expiration date/time when creating the new channel request. It should be noted that all individual users that are in a channel always retain the ability to leave a channel without terminating the channel for those that remain.

Once the communication server 950 creates the URL link, it may then send it back to the requestor in block 1004. The requestor may then share the URL link with one or more other users via text message, email, or other messaging means in block 1006. The URL link is the equivalent of an invitation to join the new channel. Any recipient of the URL link may click on the link or otherwise engage the URL link which will cause the opening of the companion application on the recipient's device and display the new channel invitation and information in block 1008. Should the recipient open the URL link using a device that does not have the companion application loaded thereon, the URL link will attempt to take the user to a location where the companion application may be downloaded. In the case of a smartphone, that may be a redirection to the Apple store for iPhones, or the Google Play store for Android devices. The user may also opt to open the URL from a device that already has the companion application loaded.

Once the URL invitation has been opened within the companion application, the recipient may view information pertaining to the new channel invitation and accept the invitation on behalf of one or more communication devices 910-1, 910-2, 910-3 under the control of the master account at block 1010. The companion application may display information such as the identity of the new channel creator, a name for the new channel, and the identities of other users that are already in the channel. The companion application may manage multiple other communication devices 910-1, 910-2, 910-3 and may opt to accept the channel invitation at the account level but individually enable it on any subset of communication devices 910-1, 910-2, 910-3 it manages including itself 910. This allows, for instance, a parent to allow one communication device 910-1 to join the new channel but not other communication devices 910-2, 910-3 if it makes sense to do so.

In block 1012, the communication server 950 may add the communication devices that accepted (or had the invitation accepted on their behalf) the new channel invitation to the channel and update the channel information accordingly to reflect the new channel subscribers. In block 1014, the communication server 950 may send a notification (email, text, in app message) back to the original new channel requestor each time a new communication device is added to the channel.

Once the channel is established meaning there are at least two (2) registered communication devices, it will remain active so long as the number of active communication devices numbers at least two or, in the case of a temporary channel, the channel reaches has yet to reach its expiration time/date.

Another feature for an existing channel may be the ability to 'invite others' to join the channel. This may be done, for instance, through the companion application associated with any communication device in the channel. A user may open the companion application and cause the application to display the active channels associated with a particular communication device. The user may then select one of the channels and cause an options menu to be displayed. One of the options may be to invite others to join the channel. Selecting this option may instruct the communication server to send the URL link for the channel invite back to the user who may then send a message via a messaging application on the communication device (email, SMS, MMS, other text, app notification, etc.) to a desired recipient. This will cause the same logic flow described in FIG. 10 to repeat.

It should also be noted that each communication device has the ability to remove itself from a channel. This may be done via the companion application by selecting a 'delete' option from a menu of selections. Other options may include a pause or suspend option which causes the channel to go dormant for that communication device but does not delete it. A corresponding 'resume' option would re-activate the channel on the communication device without having to go through the entire invitation/acceptance procedure. For each option, a communication device via the companion application may be able to send an instruction to the communication server to perform the requested action (suspend, resume, delete) for one or more of the communication devices managed by that companion application.

In another embodiment, the user may be able to perform these functions directly from the communication device using a speech recognition system to parse and execute spoken commands as opposed to needing the companion application. For example, a user may be in the channel or in the equivalent of a "settings" channel and speak a command such as "delete VT football channel" or "invite Ralph to VT football channel". These commands, in conjunction with a known contacts database, may be interpreted and executed by communication server 950.

In another embodiment, anytime a communication device is added to or removed from a channel, the owner of the channel may be sent a notification indicating same. The owner of a channel may be characterized as the account owner of the companion application that originally initiated the request to create the new channel.

In another embodiment, the original requestor of the channel may hold the equivalent of administrative privileges over the channel giving that user the ability to delete the channel in its entirety if desired. Other channel members may only remove themselves from the channel but cannot eliminate the channel.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The invention claimed is:

1. A method of managing communication channels in a communication system that includes communication devices and a communication server, the method comprising:
   receiving an invitation to join a new communication channel, the invitation comprising a universal resource locator (URL) link to a location that contains instructions for joining the new communication channel;
   launching a companion application in response to activating the URL link, the companion application associated with an account administered by a communications server, the companion application configured to manage one or more communication devices;
   selecting one or more of the one or more communication devices managed by the companion application to be added to the new communication channel; and
   sending, to the communication server, an acceptance to the invitation to join the new communication channel, the acceptance including an identity of the selected communication devices to add to the new communication channel.

2. The method of claim 1, the invitation to join the new communication channel including a channel identifier to be associated with the new communication channel.

3. The method of claim 1, the companion application including an option to suspend a communication device from the new communication channel, wherein selecting the option to suspend a communication device from the new communication channel comprises:
   sending an instruction to the communication server to block the selected communication device from communicating over the new communication channel.

4. The method of claim 1, the companion application including an option to resume a communication device into the new communication channel, wherein selecting the option to resume a communication device into the new communication channel comprises:
   sending an instruction to the communication server to unblock the selected communication device from communicating over the new communication channel.

5. The method of claim 1, the companion application including an option to delete a communication device from the new communication channel, wherein selecting the option to delete a communication device from the new communication channel comprises:
   sending an instruction to the communication server to remove the selected communication device from the new communication channel.

6. The method of claim 1, the companion application including an option to invite other communication devices to the new communication channel, wherein selecting the option to invite others to the new communication channel comprises:
   sending an instruction to the communication server to make the URL link for the new communication channel available to the companion application;
   launching a messaging application in response to selecting the URL link, the messaging application creating a message including the URL link; and
   sending the message containing the URL link to one or more recipients.

7. A communication device comprising one or more processors configured to execute instructions to:
   receive an invitation to join a new communication channel, the invitation comprising a universal resource locator (URL) link to a location that contains instructions for joining the new communication channel;
   launch a companion application in response to activating the URL link, the companion application associated with an account administered by a communications server, the companion application configured to manage one or more other communication devices;
   select one or more of the one or more other communication devices managed by the companion application to be added to the new communication channel; and
   send, to the communication server, an acceptance to the invitation to join the new communication channel, the acceptance including an identity of the selected other communication devices to add to the new communication channel.

8. The communication device of claim 7, the invitation to join the new communication channel including a channel identifier to be associated with the new communication channel.

9. The communication device of claim 7, the one or more processors configured to execute instructions to:
   select one or more other communication devices managed by the companion application; and
   send an instruction to the communication server to block the one or more selected other communications devices from communicating over the new communication channel.

10. The communication device of claim 7, the one or more processors configured to execute instructions to:
   determine one or more other communication devices managed by the companion application that are blocked from communicating on the new communication channel;
   select one or more other communication devices to be unblocked from communicating on the new communication channel; and
   send an instruction to the communication server to unblock the selected other communication devices from communicating over the new communication channel.

11. The communication device of claim 7, the one or more processors configured to execute instructions to:
   determine one or more other communication devices managed by the companion application that are able to communicate on the new communication channel;
   select one or more other communication devices to be removed from communicating on the new communication channel; and
   send an instruction to the communication server to remove the selected other communication devices from the new communication channel.

12. The communication device of claim 7, the one or more processors configured to execute instructions to:
   send an instruction to the communication server to make the URL link for the new communication channel available to the companion application;
   launch a messaging application in response to selecting the URL link, the messaging application creating a message including the URL link; and
   send the message containing the URL link to one or more recipients.

13. A non-transitory computer-readable medium comprising a plurality of instructions that when executed enable processing circuitry to execute instructions to manage communication channels in a communication system, the instructions to:
   receive an invitation to join a new communication channel, the invitation comprising a universal resource locator (URL) link to a location that contains instructions for joining the new communication channel;
   launch a companion application in response to activating the URL link, the companion application associated with an account administered by a communications server, the companion application configured to manage one or more other communication devices;
   select one or more of the one or more other communication devices managed by the companion application to be added to the new communication channel; and
   send, to the communication server, an acceptance to the invitation to join the new communication channel, the acceptance including an identity of the selected other communication devices to add to the new communication channel.

14. The non-transitory computer-readable storage medium of claim 13, the invitation to join the new communication channel including a channel identifier to be associated with the new communication channel.

15. The non-transitory computer-readable storage medium of claim 13, the plurality of instructions that when executed enable the processing circuitry to:

select one or more other communication devices managed by the companion application; and send an instruction to the communication server to block the one or more selected other communications devices from communicating over the new communication channel.

16. The non-transitory computer-readable storage medium of claim 13, the plurality of instructions that when executed enable the processing circuitry to:

determine one or more other communication devices managed by the companion application that are blocked from communicating on the new communication channel;

select one or more other communication devices to be unblocked from communicating on the new communication channel; and send an instruction to the communication server to unblock the selected other communication devices from communicating over the new communication channel.

17. The non-transitory computer-readable storage medium of claim 13, the plurality of instructions that when executed enable the processing circuitry to:

determine one or more other communication devices managed by the companion application that are able to communicate on the new communication channel;

select one or more other communication devices to be removed from communicating on the new communication channel; and send an instruction to the communication server to remove the selected other communication devices from the new communication channel.

18. The non-transitory computer-readable storage medium of claim 13, the plurality of instructions that when executed enable the processing circuitry to:

send an instruction to the communication server to make the URL link for the new communication channel available to the companion application;

launch a messaging application in response to selecting the URL link, the messaging application creating a message including the URL link; and send the message containing the URL link to one or more recipients.

* * * * *